US012669079B2

(12) United States Patent
Tsutsuji

(10) Patent No.: US 12,669,079 B2
(45) Date of Patent: Jun. 30, 2026

(54) CONTROLLER FOR INTERNAL COMBUSTION ENGINE

(71) Applicant: TOYOTA JIDOSHA KABUSHIKI KAISHA, Toyota (JP)

(72) Inventor: Shunichi Tsutsuji, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/206,043

(22) Filed: May 13, 2025

(65) Prior Publication Data

US 2026/0015967 A1 Jan. 15, 2026

(30) Foreign Application Priority Data

Jul. 11, 2024 (JP) ................................ 2024-111718

(51) Int. Cl.

*F02B 37/22* (2006.01)
*F02B 37/18* (2006.01)
*F02B 37/24* (2006.01)
*F02D 13/02* (2006.01)
*F02D 23/00* (2006.01)

(52) U.S. Cl.

CPC .......... *F02B 37/22* (2013.01); *F02D 13/0249* (2013.01); *F02D 13/0261* (2013.01); *F02D 23/00* (2013.01); *F02B 37/18* (2013.01); *F02B 37/183* (2013.01); *F02B 37/24* (2013.01); *F02D 13/0215* (2013.01); *F02D 13/0242* (2013.01)

(58) Field of Classification Search

CPC ........ F02B 37/22; F02B 37/18; F02B 37/183; F02B 37/24; F02D 13/0249; F02D 13/0261; F02D 23/00; F02D 13/0215; F02D 13/0242; F02D 2041/001; F02D 41/0007; F02D 2200/0406

See application file for complete search history.

(56) References Cited

U.S. PATENT DOCUMENTS 6,662,562 B2 * 12/2003 Engel ...................... F02D 37/02
60/602
8,065,988 B2 * 11/2011 Hatamura ........... F02D 13/0257
123/347
2008/0077304 A1 * 3/2008 Suzuki ................ F02D 41/1454
701/102

(Continued)

FOREIGN PATENT DOCUMENTS

JP 2006-132410 A 5/2006
JP 2016-169641 A 9/2016

*Primary Examiner* — Matthew T Largi

(57) ABSTRACT

The controller executes acquisition process for acquiring a parameter correlated with a back pressure which is a pressure in the exhaust pipe upstream of a turbine wheel of the turbocharger, determination process for determining whether the back pressure is higher than or equal to a predetermined pressure based on the acquired parameter, and overlap limitation process for limiting a valve overlap amount between an intake valve and an exhaust valve of the internal combustion engine when it is determined that the back pressure is higher than or equal to the predetermined pressure. The overlap limitation process is a process of changing the valve closing time of the exhaust valve such that the valve overlap amount becomes smaller than that before the overlap limitation process is executed.

3 Claims, 4 Drawing Sheets

(56) References Cited

U.S. PATENT DOCUMENTS

| | | | | |
|---|---|---|---|---|
| 2009/0070014 A1* | 3/2009 | Miyashita | ............... | F02D 23/02 701/105 |
| 2009/0107142 A1* | 4/2009 | Russell | ................... | F02B 33/40 180/309 |
| 2011/0040476 A1* | 2/2011 | Ogawa | .................... | F02D 41/10 701/108 |
| 2011/0054760 A1* | 3/2011 | Ogawa | ................ | F02D 13/0261 701/102 |
| 2015/0204257 A1* | 7/2015 | Osumi | .................... | F02D 23/00 60/601 |
| 2017/0037786 A1* | 2/2017 | Fabien | .................. | F02B 37/225 |

* cited by examiner

CONTROLLER FOR INTERNAL COMBUSTION ENGINE

CROSS-REFERENCE TO RELATED APPLICATIONS

This application is based upon and claims the benefit of priority from Japanese Patent Application No. 2024-111718, filed on Jul. 11, 2024, the entire contents of which are incorporated herein by reference.

BACKGROUND

1. Field

The following description relates to a controller for an internal combustion engine.

2. Description of Related Art

Japanese Laid-Open Patent Publication No. 2016-169641 describes an example of an internal combustion engine including a turbocharger. The turbocharger of the internal combustion engine includes a nozzle vane that serves an adjustment mechanism for adjusting an amount of exhaust gas supplied to a turbine wheel.

When the nozzle vane is closed, pressure of an exhaust passage located upstream of the turbine wheel, or the back pressure, becomes high. This may limit entry of fresh air into a cylinder of the internal combustion engine.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for an internal combustion engine using hydrogen as fuel is provided. The internal combustion engine includes a variable valve mechanism configured to change a valve timing of an exhaust valve, and a turbocharger arranged in an exhaust passage. The turbocharger includes an adjustment mechanism configured to adjust an amount of exhaust gas supplied to a turbine wheel. The controller includes processing circuitry. The processing circuitry is configured to execute an acquisition process, a determination process, and an overlap limitation process. The acquisition process acquires a parameter correlated with a back pressure. The back pressure includes a pressure of the exhaust passage located upstream of the turbine wheel. The determination process determines, based on the parameter, whether the back pressure is higher than or equal to a predetermined pressure. The overlap limitation process limits a valve overlap amount between an intake valve and the exhaust valve of the internal combustion engine when the back pressure is determined as being higher than or equal to the predetermined pressure. The overlap limitation process changes a valve closing time of the exhaust valve, so that the valve overlap amount becomes smaller than the valve overlap amount before execution of the overlap limitation process.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Hereinafter, an embodiment of a controller for an internal combustion engine mounted on a vehicle will be described.

Configuration of Internal Combustion Engine

Figure 1:
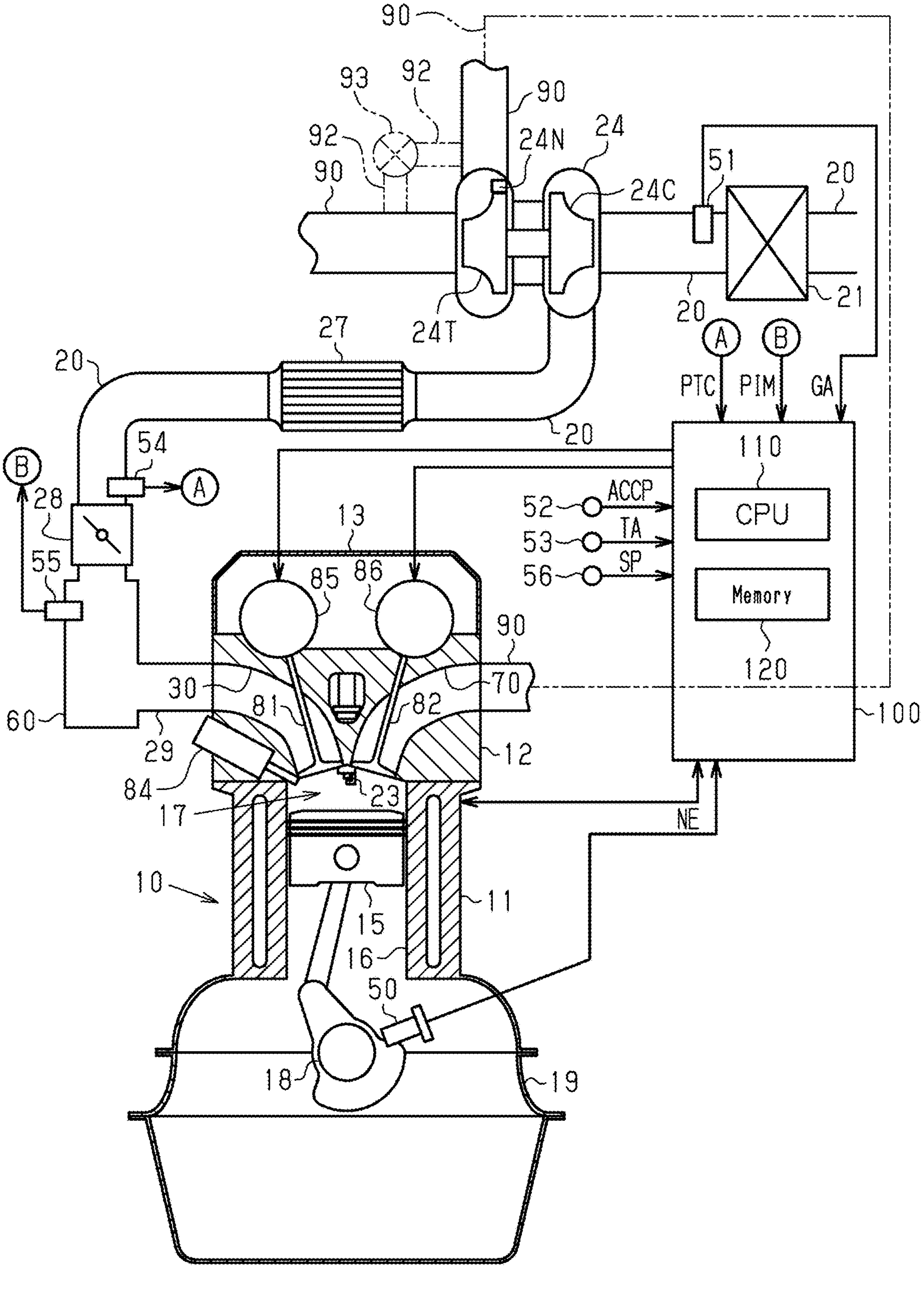
FIG. 1 is a schematic diagram showing a configuration of an internal combustion engine according to an embodiment.

As shown in FIG. 1, the internal combustion engine 10 includes a cylinder block 11, a cylinder head 12, a head cover 13, and the like.

A cylinder 16 is provided in the cylinder block 11. A piston 15 is disposed in the cylinder 16.

The cylinder head 12 includes an intake port 30 that draws intake air into a combustion chamber 17 of the internal combustion engine 10 and an exhaust port 70 that discharges exhaust gas from the combustion chamber 17. The intake port 30 includes an intake valve 81. The drive system of the intake valve 81 is provided with an intake-side variable valve mechanism 85 that is a variable valve mechanism that changes a valve opening time and a valve closing time that are valve timings of the intake valve 81.

An exhaust valve 82 is arranged in the exhaust port 70. A drive system of the exhaust valve 82 is provided with an exhaust-side variable valve mechanism 86, which is a variable valve mechanism that changes a valve opening time and a valve closing time, which are valve timings of the exhaust valve 82.

The cylinder head 12 is provided with an in-cylinder injection type fuel injection valve 84 that directly injects hydrogen, which is the fuel of the internal combustion engine 10, into the combustion chamber 17, and an ignition plug 23.

A crankcase 19 is arranged below the cylinder block 11. The crankcase 19 accommodates a crankshaft 18, which is an output shaft of the internal combustion engine 10.

An intake manifold 29 including a surge tank 60 is connected to an upstream portion of the intake port 30. An intake pipe 20 is connected to an upstream portion of the surge tank 60. The intake pipe 20, the surge tank 60, the intake manifold 29, and the intake port 30 form an intake passage of the internal combustion engine 10.

The intake pipe 20 is provided with an air cleaner 21, an air flow meter 51, a compressor wheel 24C of a turbocharger 24 that is driven using exhaust gas discharged from the combustion chamber 17, an intercooler 27, a boost pressure sensor 54, and a throttle valve 28 in this order from the upstream side. The surge tank 60 is provided with an intake pressure sensor 55. The opening degree of the throttle valve 28 is changed by an electric motor.

The air cleaner 21 filters intake air taken into the intake pipe 20. The turbocharger 24 compresses air in the intake pipe 20. The intercooler 27 cools the air that has passed through the compressor wheel 24C. The opening degree of the throttle valve 28 is adjusted to control the intake air amount.

The air flow meter 51 detects an intake air amount GA. The boost pressure sensor 54 detects a boost pressure PTC in a portion of the intake pipe 20 downstream of the compressor wheel 24C. Further, the intake pressure PIM, which is the pressure in the surge tank 60, is detected by the intake pressure sensor 55.

The downstream side of the exhaust port 70 is connected to an exhaust pipe 90 forming an exhaust passage. The exhaust pipe 90 is connected to a housing accommodating a turbine wheel 24T of the turbocharger 24. The turbocharger 24 is a variable geometry turbocharger, and includes nozzle vanes 24N driven by actuators. The nozzle vane 24N is an adjustment mechanism that adjusts the amount of exhaust gas supplied to the turbine wheel 24T. By changing the opening degree of the nozzle vane 24N, the boost pressure of the intake air increased by the turbocharger 24 is changed.

The controller 100 controls the internal combustion engine 10. The controller 100 operates various operation target devices such as the throttle valve 28, the fuel injection valve 84, the ignition plug 23, the intake-side variable valve mechanism 85, and the exhaust-side variable valve mechanism 86. In addition, the controller 100 operates various operation target devices such as actuators of the WGV 93 and the nozzle vane 24N.

The controller 100 includes a central processing unit (CPU) 110 that performs arithmetic processing, a memory 120 in which control programs and data are stored, and the like. The controller 100 executes processing relating to various types of control by the CPU 110 executing a program stored in the memory 120.

Detection signals of the air flow meter 51, the boost pressure sensor 54, and the intake pressure sensor 55 are input to the controller 100. Further, detection signals of other various sensors are input to the controller 100. For example, a detection signal of an accelerator operation amount sensor 52 that detects an accelerator operation amount ACCP that is an operation amount of an accelerator pedal that adjusts the output of the internal combustion engine 10 is input to the controller 100. Further, a detection signal of a throttle sensor 53 that detects a throttle opening degree TA that is an opening degree of the throttle valve 28 is input to the controller 100. Further, a detection signal of a crank angle sensor 50 that detects a rotation angle (crank angle) of the crankshaft 18 in order to calculate an engine rotation speed NE and a detection signal of a vehicle speed sensor 56 that detects a vehicle speed SP of the vehicle are input to the controller 100.

The controller 100 calculates an engine load factor KL based on the engine rotation speed NE and the intake air amount GA. The engine load factor KL is a parameter that determines the amount of air filling the combustion chamber 17, and is the ratio of the inflow air amount per combustion cycle in one cylinder to a reference inflow air amount. The reference inflow air amount is variably set in accordance with the engine speed NE.

The controller 100 calculates an intake-side target value VTint, which is a target valve timing of the intake valve 81, based on the engine speed NE, the engine load factor KL, and the like. After calculating the intake-side target value VTint, the controller 100 controls the drive of the intake-side variable valve mechanism 85 so that the actual valve timing of the intake valve 81 coincides with the intake-side target value VTint. In the present embodiment, a state in which the valve timing of the intake valve 81 is the most timing is set to an initial value of "O", and the valve timing of the intake valve 81 is controlled using an advance amount of the valve timing from the initial value.

The controller 100 calculates a target overlap value OLt that is a target value of a valve overlap in which the valve opening period of the intake valve 81 and the valve opening period of the exhaust valve 82 overlap each other. Then, an exhaust-side target value VText, which is a target valve timing of the exhaust valve 82, is calculated based on the target overlap value OLt and the intake-side target value VTint. When the exhaust-side target value VText is calculated, the controller 100 controls the driving of the exhaust-side variable valve mechanism 86 such that the actual valve timing of the exhaust valve 82 coincides with the exhaust-side target value VText. In the present embodiment, a state in which the valve timing of the exhaust valve 82 is the most advanced timing is set to an initial value of "0", and the valve timing of the exhaust valve 82 is controlled using the amount of retardation of the valve timing from this initial value.

The controller 100 calculates the required torque based on the accelerator operation amount ACCP, the vehicle speed SP, and the like. Then, the controller 100 controls the required output Pe of the internal combustion engine 10 so as to satisfy the required torque. Here, hydrogen gas, which is a fuel of the internal combustion engine 10, has a wider range of a combustible air-fuel mixture than gasoline, and can be combusted even in a lean air-fuel mixture. Therefore, the controller 100 performs lean combustion in which a lean air-fuel mixture, which is an air-fuel mixture having an air-fuel ratio larger than the stoichiometric air-fuel ratio, is combusted, and adjusts the output of the internal combustion engine 10 through the following combustion control.

That is, the controller 100 sets the required injection amount Qd based on the required output Pe. The requested injection amount Qd is a target value of the fuel injected from the fuel injection valve 84. Based on the target air-fuel ratio AFt and the required injection amount Qd, the controller 100 calculates a required air amount GAd that is a target value of the intake air amount required for obtaining the target air-fuel ratio AFt. In the present embodiment, the target air-fuel ratio AFt is, for example, a lean air-fuel ratio with air excess ratio $\lambda$ of 2.5 to 3.0. Then, the controller 100 controls the fuel injection valve 84 such that the required injection amount Qd is obtained. Further, the controller 100 controls the opening degree of the throttle valve 28 and the boost pressure of the turbocharger 24 such that the required air amount GAd is obtained.

When controlling the boost pressure of the turbocharger 24, the controller 100 calculates a target boost pressure PTCt. The controller 100 calculates the base opening degree VNb of the nozzle vane 24N based on the target boost pressure PTCt. The controller 100 calculates a feedback value FBV corresponding to a deviation between the target boost pressure PTCt and the actual boost pressure PTC. The feedback value FBV is set to a larger value as the value obtained by subtracting the boost pressure PTC from the target boost pressure PTCt is larger. As the feedback value FBV increases, the opening degree of the nozzle vane 24N decreases in the closing direction. The controller 100 calculates the instruction opening degree VN of the nozzle vane 24N based on the base opening degree VNb and the feedback value FBV Then, the controller 100 controls the actuators of the nozzle vanes 24N so that the actual opening degree of the nozzle vanes 24N coincides with the instruction opening degree VN.

Overlap Limitation Process

For example, when the actual boost pressure PTC is lower than the target boost pressure PTCt at the time of transition from a steady state to acceleration of the vehicle, it is preferable that the actual boost pressure PTC reaches the target boost pressure PTCt earlier. In this regard, in the present embodiment, as described above, the feedback value FBV corresponding to the deviation between the target boost pressure PTCt and the actual boost pressure PTC is calculated. Since the feedback value FBV is considered when the instruction opening degree VN of the nozzle vane 24N is calculated, the opening degree of the nozzle vane 24N is in a state of being closed more than the base opening degree VNb. When the opening degree of the nozzle vane 24N is decreased, the energy given from the exhaust gas to the turbine wheel 24T is increased, so that the rotation speed of the turbine wheel 24T is increased. When the rotation speed of the turbine wheel 24T increases, the rotation speed of the compressor wheel 24C also increases, so that the actual boost pressure PTC increases at an early stage.

Here, when the opening degree of the nozzle vane 24N decreases in the closing direction, the back pressure in the exhaust pipe 90 upstream of the turbine wheel 24T increases, which may make it difficult for fresh air to enter the cylinders of the engine 10. Such a state can be improved by reducing the valve overlap amount in which the valve opening period of the intake valve 81 and the valve opening period of the exhaust valve 82 overlap each other. Therefore, the controller 100 executes an overlap restriction process described below.

Figure 2:
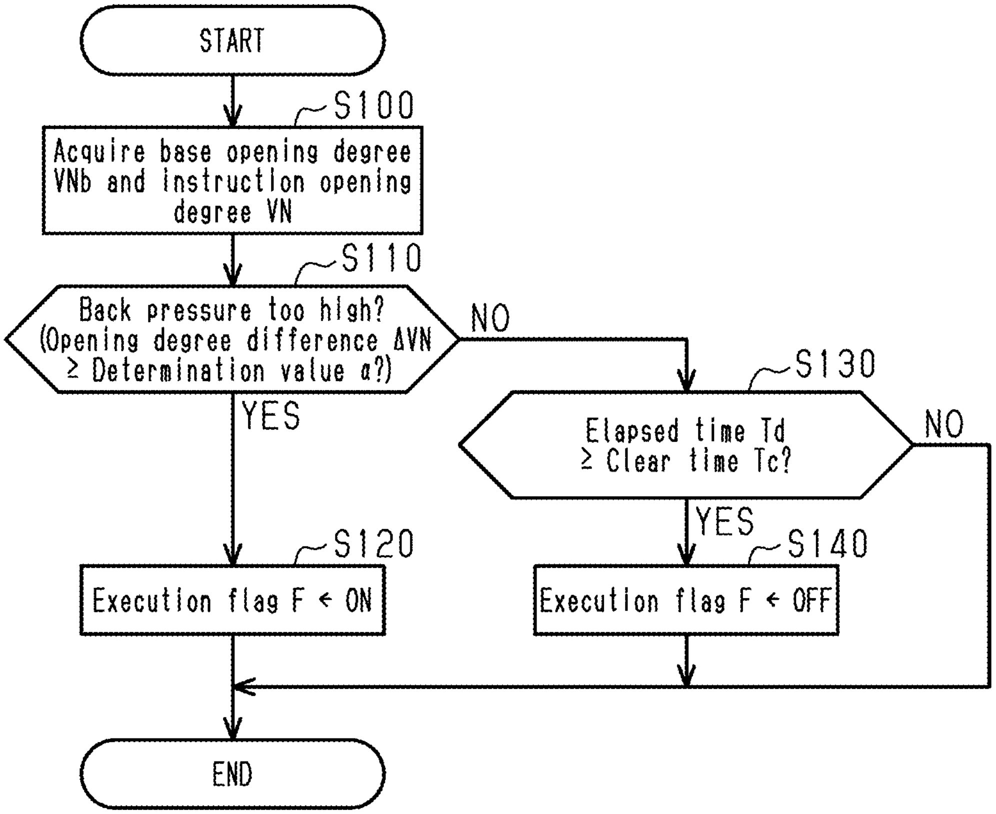
FIG. 2 is a flowchart showing a procedure of processes executed by a controller according to the embodiment.

FIG. 2 illustrates a procedure for processes executed by the controller 100. The processing shown in FIG. 2 is realized by the CPU 110 executing a program stored in the memory 120 of the controller 100 at predetermined intervals. In the following description, the letter "S" preceding a numeral indicates a step number of a process.

In the series of processes shown in FIG. 2, the controller 100 executes an acquisition process of obtaining the base opening degree VNb and the instruction opening degree VN of the nozzle vane 24N (S100). The instruction opening degree VN of the nozzle vane 24N is a parameter correlated with the back pressure described above. Instead of the instruction opening degree VN, an actual opening degree of the nozzle vane 24N may be acquired.

Next, the controller 100 executes a determination process of determining whether the back pressure is in a state of being higher than or equal to a predetermined value and is excessive (S110). The predetermined pressure is a back pressure at which the amount of fresh air introduced into the cylinder is reduced to such an extent that the overlap limitation process described later needs to be executed. In the processing of S110, the controller 100 calculates an opening degree difference ΔVN which is a difference between the acquired base opening degree VNb and the instruction opening degree VN. The value of the opening degree difference ΔVN increases as the instruction opening degree VN is closer to the closing side than the base opening degree VNb. When the opening degree difference ΔVN is equal to or greater than a predetermined determination value α, it is determined that the back pressure is equal to or greater than a predetermined pressure and is excessive. The determination value α is a value corresponding to the above-described predetermined pressure.

In the process of S110, when it is determined that the back pressure is higher than or equal to the predetermined value and is excessively high (S110: YES), the controller 100 sets the execution flag F to "ON" (S120). The execution flag F is a flag indicating whether the overlap restriction process can be executed. When the execution flag F is "ON", the overlap restriction process is executed. On the other hand, when the execution flag F is set to "OFF", the overlap limitation process being executed is stopped.

On the other hand, in the process of S110, when it is determined that the back pressure is not higher than or equal to the predetermined value and is not excessively high (S110: NO), the controller 100 determines whether the duration Td is equal to or longer than the clear time Tc (S130). The duration time Td is a time during which the opening degree difference ΔVN is continuously less than the determination value α. The clear time Tc is a value set in advance in order to set the execution flag F to "OFF", and is set in order to suppress hunting of the execution flag F.

In the process of S130, when it is determined that the duration Td is equal to or longer than the clear time Tc (S130: YES), the controller 100 sets the execution flag F to "OFF" (S140).

Then, when the process of S120 or the process of S140 is executed, or when a negative determination is made in the process of S130, the controller 100 ends the present process in the current execution cycle.

Figure 3:
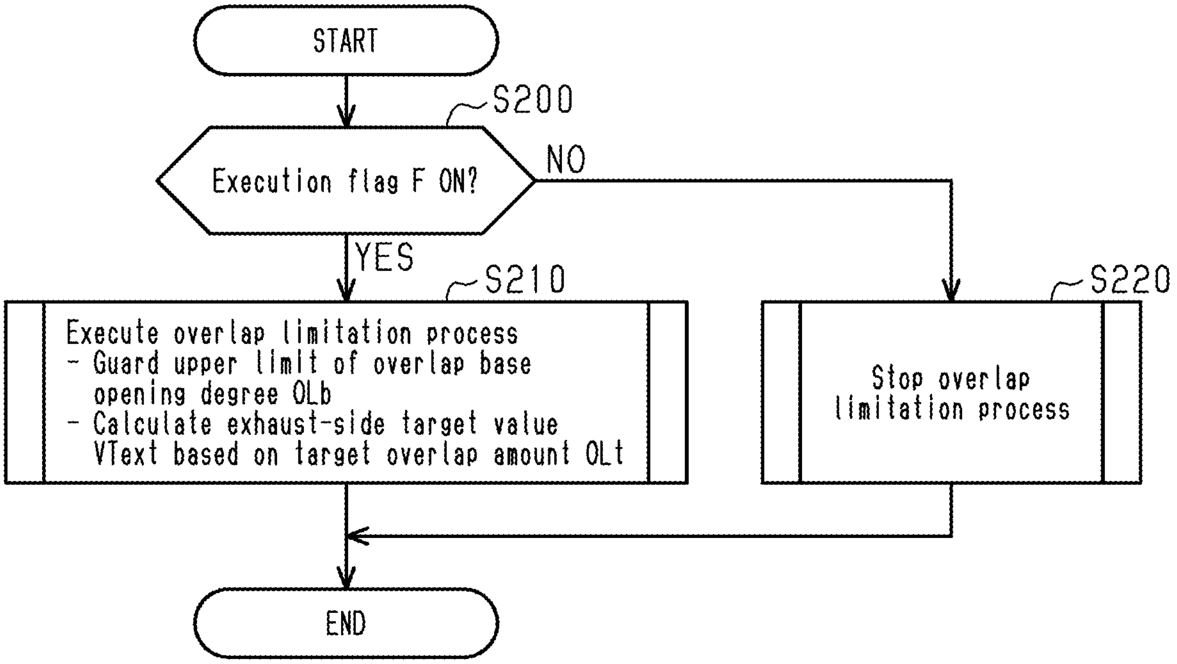
FIG. 3 is a flowchart showing a procedure of processes executed by a controller according to the embodiment.

FIG. 3 illustrates a procedure for processes executed by the controller 100. The processing shown in FIG. 3 is realized by the CPU 110 executing a program stored in the memory 120 of the controller 100 at predetermined intervals.

In the series of processes shown in FIG. 3, the controller 100 acquires the execution flag F and determines whether the value of the execution flag F is "ON" (S200).

When it is determined that the execution flag F is "ON" (S200: YES), the controller 100 executes the overlap limitation process (S210).

The overlap limitation process is a process of changing the valve closing time of the exhaust valve 82 such that the valve overlap amount becomes smaller than that before the execution of the overlap limitation process.

In the overlap limitation process, in order to reduce the valve overlap amount, a value obtained by performing an upper limit guarding process on the overlap base value OLb is substituted into the target overlap value OLt. The overlap base value OLb is a base value of the valve overlap amount set by the controller 100 based on the engine operation state such as the engine speed NE and the engine load factor KL. The upper limit value OLupp for performing the upper limit guarding process is set to a value smaller than the overlap base value OLb. As the upper limit value OLupp, a minimum A and a maximum B are set in advance. The upper limit value OLupp during execution of the overlap limitation process is set to the minimum A. For example, a value smaller than at least the minimum value of the overlap base value OLb, for example, "0°", is set as the minimum value A. On the other hand, the upper limit value OLupp during non-execution of the overlap limitation process is set to the maximum value B. The maximum value B is set to, for example, a value larger than at least the maximum value of the overlap base value OLb, for example, "100°".

Further, the controller 100 executes the following processing when executing the overlap restriction processing.

a) At the start of the overlap limitation process, a gradual change value OLc obtained by performing a gradual change process on the upper limit value OLupp is calculated in order to suppress a sudden change in the intake air amount associated with the switching of the upper limit value OLupp from the maximum B to the minimum A. Then, the upper limit guard of the overlap base value OLb is executed with the gradual change value OLc.

b) In the gradual change process of the upper limit value OLupp executed at the start of the overlap limitation process, the value of the overlap base value OLb at the start of the overlap limitation process is substituted for the initial value of the gradual change value OLc. Thus, the upper limit guard of the overlap base value OLb is promptly performed.

c) At the end of the overlap limitation process, a gradual change value OLc obtained by performing a gradual change process on the upper limit value OLupp is calculated in order to suppress a sudden change in the intake air amount caused by switching of the upper limit value OLupp from the minimum A to the maximum B. Then, the upper limit guard of the overlap base value OLb is executed with the gradual change value OLc.

Then, the controller 100 calculates the exhaust-side target value VText based on the target overlap value OLt subjected to the upper limit guard. As described above, since the upper limit guarding process is performed, the target overlap value OLt is smaller than that when the upper limit guarding process is not performed. Therefore, the retard amount of the valve timing of the exhaust valve 82, which is calculated based on the target overlap value OLt subjected to the upper limit guarding process, is smaller than that in the case where the upper limit guarding process is not performed, and the retard amount is limited.

Then, when the process of S210 is executed, or when a negative determination is made in the process of S200, the controller 100 ends the present process in the current execution cycle.

Operation of the Present Embodiment

Figure 4:
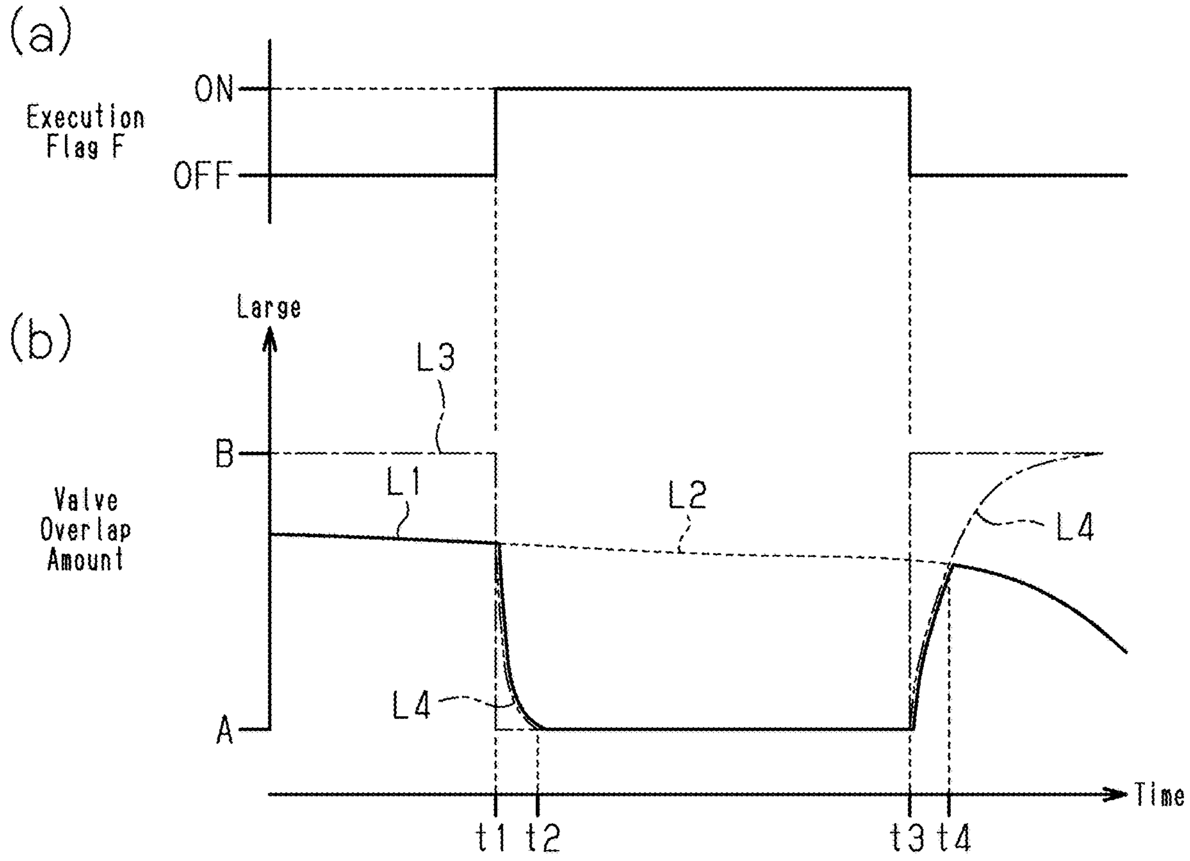
In FIG. 4, sections (a) and (b) are timing charts showing the operation of the embodiment, in which section (a) shows the state of the execution flag, and section (b) shows the transition of the valve overlap amount.

Section (a) of FIG. 4 shows the state of the execution flag F, and section (b) of FIG. 4 shows the transition of the valve overlap amount. Further, a solid line L1 shown in section (b) of FIG. 4 indicates a transition of the target overlap value OLt, a broken line L2 indicates a transition of the overlap base value OLb, a one dot chain line L3 indicates a transition of the upper limit value OLupp, and a two dot chain line L4 indicates a transition of the gradual change value OLc.

At time t1, when the execution flag F is switched from OFF to ON due to the determination that the back pressure is high, the overlap limitation process is started, and the upper limit value OLupp is switched from the maximum B to the minimum A. Further, the overlap base value OLb at the time t1 is set as the initial value of the gradual change value OLc.

The gradual change value OLc gradually decreases toward the upper limit value OLupp set to the minimum A, and finally coincides with the upper limit value OLupp (time t2). In the period (from time t1 to time t2) in which the gradual change value OLc is calculated, the overlap base value OLb is larger than the gradual change value OLc. Thus, the upper limit of the overlap base value OLb is guarded by the gradual change value OLc. Therefore, in the period from time t1 to time t2, the gradual change value OLc is substituted into the target overlap value OLt.

After the time t2, since the overlap base value OLb is larger than the upper limit value OLupp set to the minimum A, the overlap base value OLb is upper-limit-guarded by the upper limit value OLupp. Therefore, after the time t2, the upper limit value OLupp set to the minimum Ais substituted into the target overlap value OLt.

When the execution flag F is switched from ON to OFF at time t3, the overlap limitation process is stopped, and the upper limit value OLupp is switched from the minimum A to the maximum B. Then, the smallest value A of the upper limit OLupp is set as the initial value of the gradual change value OLc.

The gradual change value OLc gradually increases toward the upper limit value OLupp set to the maximum value B, and finally coincides with the upper limit value OLupp set to the maximum value B.

In the process in which the gradual change value OLc increases, the upper limit of the overlap base value OLb is guarded by the gradual change value OLc in the period from time t3 to time t4 in which the overlap base value OLb is larger than the gradual change value OLc. Therefore, during the period from time t3 to time t4, the gradual change value OLc is substituted into the target overlap value OLt.

On the other hand, in the process in which the gradual change value OLc increases, the upper limit of the overlap base value OLb is not guarded by the gradual change value OLc after the time t4 at which the gradual change value OLc becomes larger than the overlap base value OLb. Therefore, after the time t4, the overlap base value OLb is substituted into the target overlap value OLt.

Advantages of the Present Embodiment (1) The controller 100 executes the acquisition process that acquires the parameter correlated with the back pressure of the exhaust pipe 90 located upstream of the turbine wheel 24T. The controller 100 executes the determination process that determines, based on the parameter, whether the back pressure is higher than or equal to the predetermined pressure. When the back pressure is determined as being higher than or equal to the predetermined pressure, the controller 100 executes the overlap limitation process that limits the valve overlap amount between the intake valve 81 and the exhaust valve 82 of the internal combustion engine 10. The overlap limitation process changes the valve closing time of the exhaust valve 82, so that the valve overlap amount becomes smaller than the valve overlap amount before execution of the overlap limitation process.

In the internal combustion engine 10 using hydrogen as fuel, if fuel injection is performed before the intake valve 81 is closed, pre-ignition or the like may occur. Therefore, it is preferred that fuel injection is performed after the intake valve 81 is closed. If the opening time of the intake valve 81 is retarded, the valve overlap amount decreases. However, if the opening time of the intake valve 81 is retarded, the closing time of the intake valve 81 is also retarded.

If the closing time of the intake valve 81 is retarded, a period from when the intake valve 81 is closed to when the air-fuel mixture is ignited becomes shorter. This shortens the period during which fuel injection can be performed. In this manner, if the valve timing of the intake valve 81 is changed to decrease the valve overlap amount, the fuel injectable period may be shortened. Accordingly, changes to the valve timing of the intake valve 81 are prone to restrictions.

In this respect, when the back pressure is relatively high, the present embodiment changes the valve closing time of the exhaust valve 82 so as to decrease the valve overlap amount. Such a decrease in the valve overlap amount reduces the amount of internal EGR (exhaust gas recirculation), thereby facilitating entry of fresh air into the cylinder.

When decreasing the valve overlap amount in the internal combustion engine 10 that uses hydrogen as fuel, the valve timing of the exhaust valve 82 is changed instead of changing the valve timing of the intake valve 81, which is prone to restrictions as described above. This reduces restrictions imposed on the valve timing when decreasing the valve overlap amount.

(2) When the opening degree of the nozzle vane 24N is controlled in a state smaller than the base opening degree VNb, the back pressure increases. Accordingly, when the instruction opening degree VN of the nozzle vane 24N is controlled in a state smaller by at least the determination value $\alpha$ than the base opening degree VNb set based on the target boost pressure PTCt of the turbocharger 24, the present embodiment determines that the back pressure is higher than or equal to the predetermined pressure. This allows for determination that the back pressure is relatively high based on the opening degree of the nozzle vane.

(3) The overlap limitation process includes a process that sets the upper limit value OLupp to a value smaller than the overlap base value OLb. The overlap base value OLb is the base value of the valve overlap amount. The upper limit value OLupp is used in the upper limit guarding process performed on the overlap base value OLb.

Accordingly, during execution of the overlap limitation process, the upper limit value OLupp used in the upper limit guarding process performed on the overlap base value OLb is set to a value smaller than the overlap base value OLb. This decreases the valve overlap amount to be smaller than the valve overlap amount before the execution of the overlap limitation process.

Modified Examples

The above-described embodiments may be modified as follows. The above-described embodiments and the following modifications can be combined as long as the combined modifications remain technically consistent with each other.

When the opening degree of the nozzle vane 24N is controlled to be smaller than the base opening degree VNb set based on the engine operation state, the back pressure becomes higher as the difference between the instruction opening degree VN of the nozzle vane 24N and the base opening degree VNb becomes larger. Therefore, it is preferable to reduce the valve overlap amount when the difference is large.

Therefore, when the opening degree of the nozzle vane 24N is controlled to be smaller than the base opening degree VNb set based on the engine operation state, the value of the upper limit value OLupp set during the execution of the overlap limitation process may be set as follows. That is, when the difference between the opening degree of the nozzle vane 24N and the base opening degree VNb is large, the upper limit value OLupp may be set to a smaller value than when the difference is small.

Figure 5:
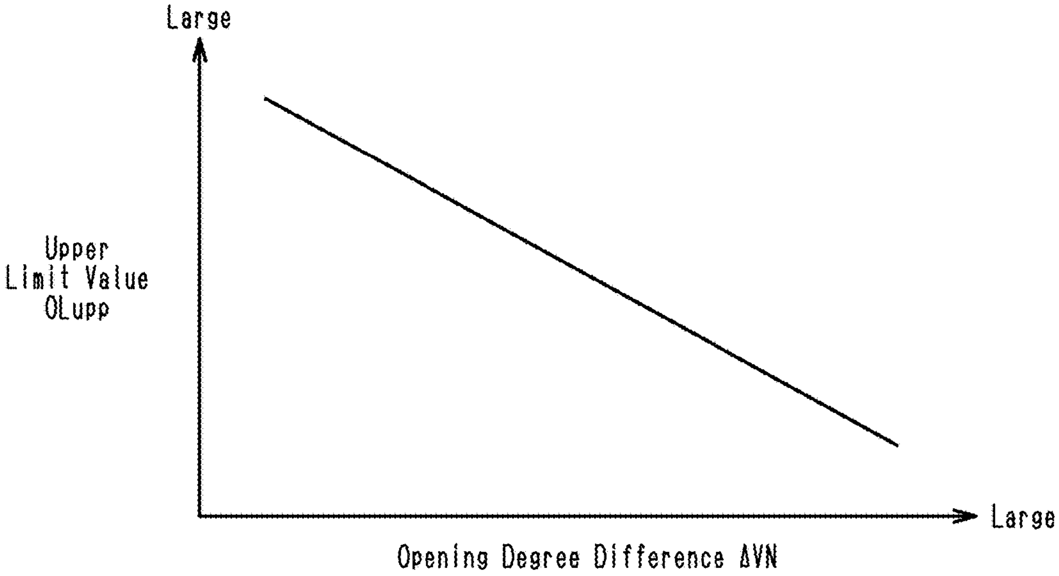
FIG. 5 is a graph showing a correspondence relationship between an opening degree difference and an upper limit value in a modification of the embodiment.

As shown in FIG. 5, the value of the upper limit value OLupp may be set such that the value of the upper limit value OLupp decreases as the opening degree difference $\Delta$VN increases.

According to this modification, the upper limit value OLupp can be appropriately set in accordance with the magnitude of the estimated back pressure.

As indicated by a two dot chain line in FIG. 1, a portion of an exhaust pipe 90 of the engine 10 upstream of the turbine wheel 24T and a portion of the exhaust pipe 90 downstream of the turbine wheel 24T communicate with each other via a bypass passage 92. A wastegate valve (hereinafter, referred to as WGV) 93 whose opening degree is adjusted by an actuator is provided in the middle of the bypass passage 92. The WGV 93 is a valve that adjusts the amount of exhaust gas flowing through the bypass passage 92. That is, the WGV 93 is a valve that adjusts the amount of exhaust gas that flows while bypassing the turbine wheel 24T. The opening degree of the WGV 93 is feedback-controlled based on the target boost pressure PTCt, for example, similarly to the opening degree control of the nozzle vane 24N. As the opening degree of the WGV 93 increases, the amount of exhaust gas that bypasses the turbine wheel 24T and passes through the bypass passage 92 increases, and thus the boost pressure of the intake air increased by the turbocharger 24 decreases.

In a case where the internal combustion engine 10 is provided with such a WGV 93, similarly to the case of the nozzle vane 24N, when the WGV 93 is closed at the time of acceleration or the like to promote an increase in the boost pressure, the back pressure increases, and there is a concern that new introduction will be hindered. Therefore, in the processing of the S110 shown in FIG. 2, whether the back pressure is excessive is determined based on the opening degree of the nozzle vane 24N, but instead of this, whether the back pressure is excessive may be determined based on the opening degree of the WGV 93.

Figure 6:
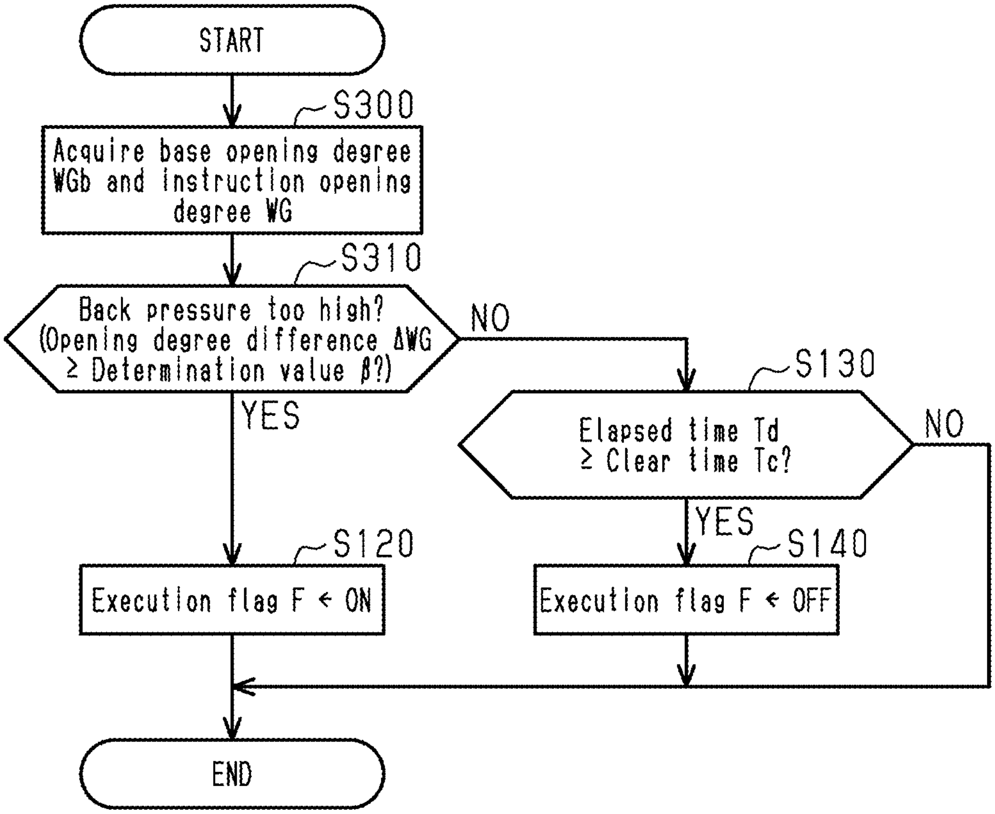
FIG. 6 is a flowchart illustrating the procedure of the process executed by the controller in a modification of the embodiment.

As shown in FIG. 6, for example, the controller 100 executes a S100 process instead of the S300 process shown in FIG. 2. In the process of S300, the controller 100 executes an acquisition process of obtaining the base opening degree WGb and the instruction opening degree WG of the WGV 93. The base opening degree WGb of the WGV 93 is set based on the target boost pressure PTCt. The instruction opening degree WG of the WGV 93 is an output value of feedback control relating to the opening degree of the WGV 93, and the controller 100 controls the actuator of the WGV 93 so that the actual opening degree of the WGV 93 matches the instruction opening degree WG. The instruction opening degree VN of the WGV 93 is a parameter that correlates with the back pressure described above. Instead of the instruction opening degree VN, an actual opening degree of the WGV 93 may be acquired.

Next, the controller 100 executes a S110 process instead of the S310 process illustrated in FIG. 2. In the S310 process, the controller 100 executes a determination process of determining whether the back pressure is in a state of being higher than or equal to a predetermined value and is excessively high. The predetermined pressures are the same as the predetermined pressures in the treatment of S110. In the process of S310, the controller 100 calculates an opening degree difference $\Delta$WG which is a difference between the acquired base opening degree WGb and the instruction opening degree WG. The value of the opening degree difference ΔWG increases as the instruction opening degree WG is closer to the closing side than the base opening degree WGb. When the opening degree difference ΔWG is equal to or greater than a predetermined determination value β, it is determined that the back pressure is equal to or greater than a predetermined pressure and is excessive. The determination value β is a value corresponding to the above-described predetermined pressure.

In the process of S310, when it is determined that the back pressure is higher than or equal to the predetermined value and is excessively high (S310: YES), the controller 100 sets the execution flag F to "ON" (S120) and ends the process.

On the other hand, when it is determined in the process of S310 that the back pressure is not higher than or equal to the predetermined value and is not excessively high (S310: NO), the controller 100 executes the process of S130 and the process of S140 described above and ends the present process.

As described above, when the indicated opening degree WG of the WGV 93 is controlled to be smaller than the base opening degree WGb set based on the target boost pressure PTCt by a predetermined value or more, it is determined that the back pressure is excessive. When it is determined that the back pressure is excessive, the execution flag F may be set to ON and the overlap limitation process may be executed, as in the above embodiment. Also in this case, the same effect as that of the above-described embodiment can be obtained.

In the process of S110 shown in FIG. 2, it is determined that the back pressure is excessive when the opening degree difference ΔVN is equal to or larger than the determination value α. In addition, as the condition for determining that the back pressure is excessive, a condition that the feedback value FBV regarding the opening degree of the nozzle vane 24N is equal to or greater than a predetermined value, a condition that the amount of change in the accelerator operation amount ACCP is equal to or greater than a predetermined value, or the like may be added.

In the processing of the S110 shown in FIG. 2, whether the back pressure is excessive is determined based on the opening degree of the nozzle vane 24N, but instead of this, a sensor for detecting the back pressure is provided. Then, whether the back pressure is excessive may be determined based on the pressure detected by the sensor.

The gradual change process of the upper limit value OLupp executed at the start or end of the overlap limitation process may be omitted.

The internal combustion engine 10 may include a fuel injection valve of a port injection type that injects fuel into the intake port 30.

The internal combustion engine 10 may not include the intake-side variable valve mechanism 85.

The controller 100 is not limited to a device that includes a CPU and a memory module and executes software processing. For example, the controller 100 may include a dedicated hardware circuit such as an application specific integrated circuit (ASIC) that performs hardware processing on at least a part of the software processing in the above-described embodiment. That is, the controller 100 may be modified as long as it includes processing circuitry that has any one of the following configurations (a) to (c). (a) Processing circuitry including at least one processor that executes all of the above-described processes according to programs and at least one program storage device such as a ROM that stores the programs. (b) Processing circuitry including at least one processor and at least one program storage device that execute part of the above-described processes according to the programs and at least one dedicated hardware circuit that executes the remaining processes. (c) Processing circuitry including at least dedicated hardware circuit that executes all of the above-described processes. The program storage device, which is a computer-readable medium, includes any type of media that is accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine using hydrogen as fuel, the internal combustion engine including a variable valve mechanism configured to change a valve timing of an exhaust valve, and a turbocharger arranged in an exhaust passage, the turbocharger including an adjustment mechanism configured to adjust an amount of exhaust gas supplied to a turbine wheel, the controller comprising:

processing circuitry, wherein:

the processing circuitry is configured to execute an acquisition process that acquires a parameter correlated with a back pressure, the back pressure including a pressure of the exhaust passage located upstream of the turbine wheel, a determination process that determines, based on the parameter, whether the back pressure is higher than or equal to a predetermined pressure, and an overlap limitation process that limits a valve overlap amount between an intake valve and the exhaust valve of the internal combustion engine when the back pressure is determined as being higher than or equal to the predetermined pressure, the overlap limitation process changes a valve closing time of the exhaust valve, so that the valve overlap amount becomes smaller than the valve overlap amount before execution of the overlap limitation process, the turbocharger includes a variable displacement turbocharger, and has a nozzle vane as the adjustment mechanism, the acquisition process acquires an opening degree of the nozzle vane as the parameter, and when the opening degree of the nozzle vane is controlled in a state smaller by at least a predetermined value than the opening degree of the nozzle vane set based on a target boost pressure of the turbocharger, the determination process determines that the back pressure is higher than or equal to the predetermined pressure.

2. A controller for an internal combustion engine using hydrogen as fuel, the internal combustion engine including a variable valve mechanism configured to change a valve timing of an exhaust valve, and a turbocharger arranged in an exhaust passage, the turbocharger including an adjustment mechanism configured to adjust an amount of exhaust gas supplied to a turbine wheel, the controller comprising:

processing circuitry, wherein:

the processing circuitry is configured to execute an acquisition process that acquires a parameter correlated with a back pressure, the back pressure including a pressure of the exhaust passage located upstream of the turbine wheel, a determination process that determines, based on the parameter, whether the back pressure is higher than or equal to a predetermined pressure, and an overlap limitation process that limits a valve overlap amount between an intake valve and the exhaust valve of the internal combustion engine when the back pressure is determined as being higher than or equal to the predetermined pressure, the overlap limitation process changes a valve closing time of the exhaust valve, so that the valve overlap amount becomes smaller than the valve overlap amount before execution of the overlap limitation process, the overlap limitation process includes a process that sets an upper limit value of the valve overlap amount to a value smaller than a base value of the valve overlap amount, the base value being set based on an engine operation state, and the upper limit value being used in an upper limit guarding process performed on the base value, the turbocharger includes a variable displacement turbocharger, and has a nozzle vane as the adjustment mechanism, and when an opening degree of the nozzle vane is controlled in a state smaller than a base opening degree set based on an engine operation state, the upper limit value is set to decrease as a difference between the opening degree of the nozzle vane and the base opening degree increases.

3. A controller for an internal combustion engine using hydrogen as fuel, the internal combustion engine including a variable valve mechanism configured to change a valve timing of an exhaust valve, and a turbocharger arranged in an exhaust passage, the turbocharger including an adjustment mechanism configured to adjust an amount of exhaust gas supplied to a turbine wheel, the controller comprising:

processing circuitry, wherein:

the processing circuitry is configured to execute an acquisition process that acquires a parameter correlated with a back pressure, the back pressure including a pressure of the exhaust passage located upstream of the turbine wheel, a determination process that determines, based on the parameter, whether the back pressure is higher than or equal to a predetermined pressure, and an overlap limitation process that limits a valve overlap amount between an intake valve and the exhaust valve of the internal combustion engine when the back pressure is determined as being higher than or equal to the predetermined pressure, the overlap limitation process changes a valve closing time of the exhaust valve, so that the valve overlap amount becomes smaller than the valve overlap amount before execution of the overlap limitation process, the adjustment mechanism includes a wastegate valve configured to adjust an amount of an exhaust gas flow bypassing the turbine wheel, the acquisition process acquires an opening degree of the wastegate valve as the parameter, and when the opening degree of the wastegate valve is controlled in a state smaller by at least a predetermined value than the opening degree of the wastegate valve set based on a target boost pressure of the turbocharger, the determination process determines that the back pressure is higher than or equal to the predetermined pressure.

* * * * *